United States Patent
Li (10) Patent No.: US 10,175,516 B2
(45) Date of Patent: Jan. 8, 2019

(54) DOUBLE SIDE DISPLAY FRAME AND DOUBLE SIDE DISPLAY

(71) Applicant: Shenzhen China Star Optoelectronics Technology Co., Ltd., Shenzhen, Guangdong (CN)

(72) Inventor: Quan Li, Guangdong (CN)

(73) Assignee: Shenzhen China Star Optoelectronics Technology Co., Ltd, Shenzhen, Guangdong (CN)

(*) Notice: Subject to any disclaimer, the term of this patent is extended or adjusted under 35 U.S.C. 154(b) by 318 days.

(21) Appl. No.: 15/032,616

(22) PCT Filed: Feb. 25, 2016

(86) PCT No.: PCT/CN2016/074595
§ 371 (c)(1),
(2) Date: Apr. 27, 2016

(87) PCT Pub. No.: WO2017/124608
PCT Pub. Date: Jul. 27, 2017

(65) Prior Publication Data
US 2018/0046014 A1 Feb. 15, 2018

(30) Foreign Application Priority Data
Jan. 18, 2016 (CN) .......................... 2016 1 0032961

(51) Int. Cl.
*G06F 1/16* (2006.01)
*G02F 1/1333* (2006.01)
(Continued)

(52) U.S. Cl.
CPC .. *G02F 1/133308* (2013.01); *G02F 1/133385* (2013.01); *G02F 1/133553* (2013.01);
(Continued)

(58) Field of Classification Search
None
See application file for complete search history.

(56) References Cited

U.S. PATENT DOCUMENTS 6,104,371 A * 8/2000 Wang ..................... G02B 6/001
345/102
2005/0099793 A1* 5/2005 Ogawa ................ G02B 6/0068
362/613
(Continued)

FOREIGN PATENT DOCUMENTS

| CN | 1485658 A | 3/2004 |
| CN | 1485659 A | 3/2004 |

(Continued)

*Primary Examiner* — Courtney Smith
*Assistant Examiner* — Rashen E Morrison
(74) *Attorney, Agent, or Firm* — Andrew C. Cheng (57) ABSTRACT

The present invention discloses a double side display frame, comprising a top, a first side part, a bottom and a second side part which are connected end to end and jointly surround a backlight cavity, and the bottom and the top are oppositely located between the first side part and the second side part; the first side part comprises a first window and a first installation slot, and the first window penetrates a middle part of the first side part and communicates with the backlight cavity, and the first installation slot is located at periphery of the first window; the second side part comprises a second window and a second installation slot, and the second window penetrates a middle part of the second side part and communicates with the backlight cavity, and the second installation slot is located at periphery of the second window.

16 Claims, 6 Drawing Sheets

(51) Int. Cl.
*G02F 1/1335* (2006.01)
*G06F 1/00* (2006.01)

(52) U.S. Cl.
CPC .......... *G06F 1/00* (2013.01); *G02F 1/133615* (2013.01); *G02F 2001/133342* (2013.01); *G06F 1/16* (2013.01)

(56) References Cited

U.S. PATENT DOCUMENTS

2005/0140847 A1* 6/2005 Jeon .................... G02B 6/0036
                                                                    349/62
2016/0154269 A1* 6/2016 Fukuoka ........... G02F 1/133536
                                                                    345/690
2016/0238781 A1* 8/2016 Zhao .................... G02B 6/0088
2017/0103718 A1* 4/2017 Miller ................. G02F 1/13338

FOREIGN PATENT DOCUMENTS

| CN | 1614472 A   | 5/2005 |
|----|-------------|--------|
| CN | 101211054 A | 7/2008 |
| CN | 101469838 A | 7/2009 |
| CN | 101813295 A | 8/2010 |
| CN | 103176304 A | 6/2013 |
| CN | 103605236 A | 2/2014 |

\* cited by examiner

FIG. 6

DOUBLE SIDE DISPLAY FRAME AND DOUBLE SIDE DISPLAY

CROSS REFERENCE

This application claims the priority of Chinese Patent Application No. 201610032961.X, entitled "Double side display frame and double side display", filed on Jan. 18, 2016, the disclosure of which is incorporated herein by reference in its entirety.

FIELD OF THE INVENTION

The present invention relates to a display technology field, and more particularly to a double side display frame and a double side display utilizing the double side display frame.

BACKGROUND OF THE INVENTION

The LCD (Liquid Crystal Display) possesses advantages of thin body, power saving and no radiation to be widely used in many application scope. Most of the liquid crystal displays on the present market are back light type liquid crystal displays, which comprise a liquid crystal display panel and a back light module. The working principle of the liquid crystal display panel is to locate liquid crystal molecules between two parallel glass substrates, and a plurality of vertical and horizontal tiny electrical wires are between the two glass substrates. The light of back light module is reflected to generate images by applying driving voltages to control whether the liquid crystal molecules to be changed directions. However, the liquid crystal display panel itself does not emit light and needs the back light module to provide light source for normally showing images.

Recently, with the development of the liquid crystal display technology, the liquid crystal display of single side display can no longer adapt with the demands of market changing. Manufacturing the liquid crystal display with double side display function is one of many development directions. However, the double side display generally is assembled with two single side display, which utilizes two backlight modules, and the production cost is high, and the volume is large. For solving the aforesaid issues, the insiders propose a kind of backlight module, the light guide plate of the backlight module has two illuminating surfaces. The two display surfaces employed for display are adhered at two sides of the light guide plate. The solution can eliminate one backlight module but the display uniformity of the display panel is not uniform, and more particularly the nonuniformity is more obvious for the large scale display.

SUMMARY OF THE INVENTION

An objective of the present invention is to provide a double side display frame for installing the display panels to form a double side display, and the brightness of the display panels which are installed on the double side display frame is uniform.

Besides, the present invention further provides a double side display utilizing the double side display frame, and the brightness of the double side display is uniform.

For realizing the aforesaid objective, the technical solution utilized by the embodiments of the present invention is:

First, provided is a double side display frame, comprising a top, a first side part, a bottom and a second side part which are connected end to end and jointly surround a backlight cavity, and the bottom and the top are oppositely located between the first side part and the second side part;

the first side part comprises a first window and a first installation slot, and the first window penetrates a middle part of the first side part and communicates with the backlight cavity, and the first installation slot is located at periphery of the first window;

the second side part comprises a second window and a second installation slot, and the second window penetrates a middle part of the second side part and communicates with the backlight cavity, and the second installation slot is located at periphery of the second window;

the bottom comprises a first surface facing the top, and the first surface protrudes toward the top.

The first side part and the bottom form a first angle, and the second side part and the bottom form a second angle, and both the first angle and the second angle are acute angles.

A middle part of the first surface protrudes toward the top relative to two sides of the first surface.

The first surface is a cambered surface or a step surface.

The bottom further comprises a second surface oppositely located to the first surface, and the second surface comprises cooling fins or thermotubes.

The top comprises a first face facing the bottom, and the first face protrudes toward the bottom.

A middle part of the first face protrudes toward the bottom relative to two sides of the first face.

The first face is a cambered face, a step face or a serrated face.

The double side display frame further comprises a reflective component, and the reflective component comprises a installation face and a reflective face which are oppositely located, and the top comprises a first face facing the bottom, and the installation face is located to be adhered to the first face, and the reflective face protrudes toward a direction away from the installation face.

Second, further provided is a double side display, comprising a first display panel, a second display panel, a light source component and a double side display frame;

the first display panel is installed in the first installation slot and covers the first window;

the second display panel is installed in the second installation slot and covers the second window;

the light source component is installed on the first surface, and light emitted by the light source component passes through the backlight cavity and then enters the first display panel and the second display panel.

Compared with prior art, the present invention possesses benefits below:

As the double side display frame of the present invention is employed to install the display panels to form the double side display, two display panels are respectively installed in the first installation slot and the second installation slot, and respectively cover the first window and the second window for achieving the double display function of the double side display. Meanwhile, the light source is located on the first surface. Because the first surface protrudes toward the top, the light source has a very large lighting angle, and the light emitted by the light source can uniformly enter the backlight cavity. After the light is uniformly mixed in the backlight cavity, the light enters the two display panels respectively, and thus to provide the backlight source for the two display panels. Accordingly, the brightness of the two display panels which are installed in the double side display frame is uniform.

The light source component of the double side display according to the present invention is distributed on the first surface of the double side display frame. Because the first surface protrudes toward the top, the light source has a very large lighting angle, and the light emitted by the light source can uniformly enter the backlight cavity. After the light is uniformly mixed in the backlight cavity, the light enters the first display panel and the second display panel respectively, and thus to provide the backlight source for the first display panel and the second display panel. Accordingly, the brightnesses of first display panel and the second display panel are uniform. Moreover, the first display panel and the second display panel have the same display brightness, and the display brightness of the double side display is uniform.

BRIEF DESCRIPTION OF THE DRAWINGS

In order to more clearly illustrate the embodiments of the present invention, the following figures will be described in the embodiments are briefly introduced. It is obvious that the drawings are only some embodiments of the present invention, those of ordinary skill in this field can obtain other figures according to these figures without paying the premise.

DETAILED DESCRIPTION OF PREFERRED EMBODIMENTS

Embodiments of the present invention are described in detail with the technical matters, structural features, achieved objects, and effects with reference to the accompanying drawings as follows. It is clear that the described embodiments are part of embodiments of the present invention, but not all embodiments. Based on the embodiments of the present invention, all other embodiments to those of ordinary skill in the premise of no creative efforts obtained, should be considered within the scope of protection of the present invention.

Figure 1:
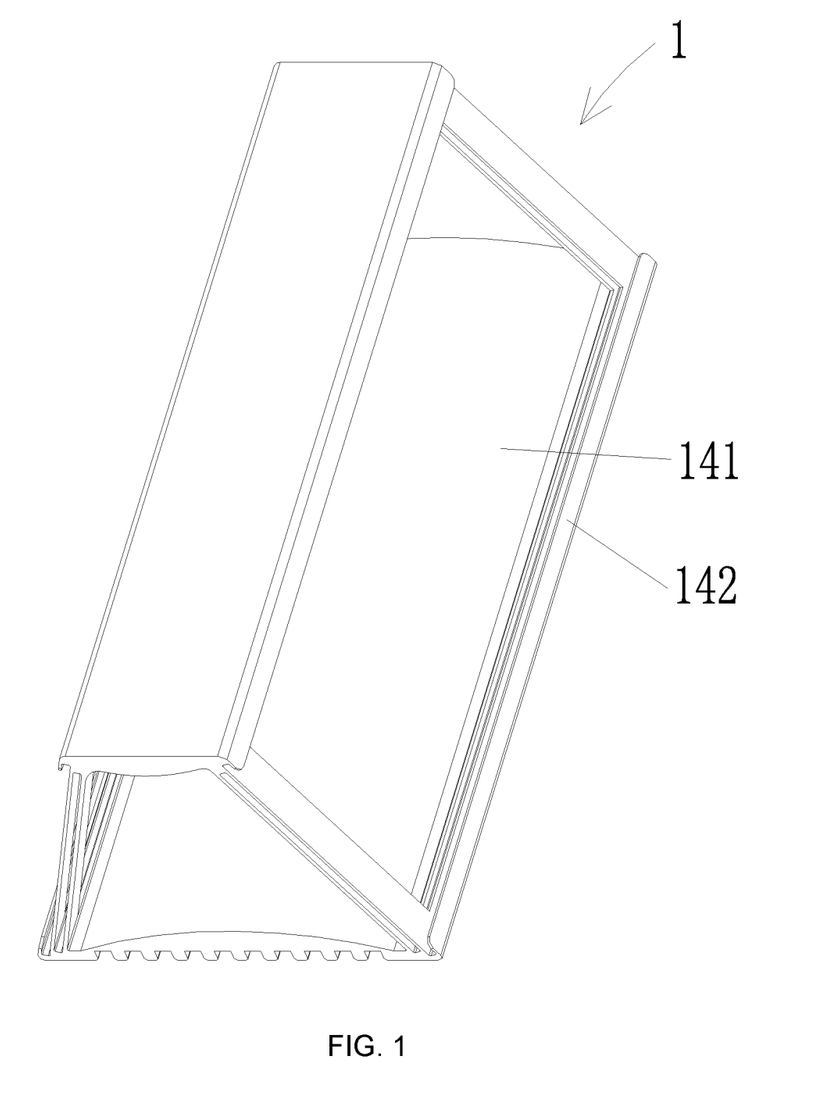
FIG. 1 is a stereoscopic structure diagram of a double side display frame provided by the embodiment of the present invention.
Figure 2:
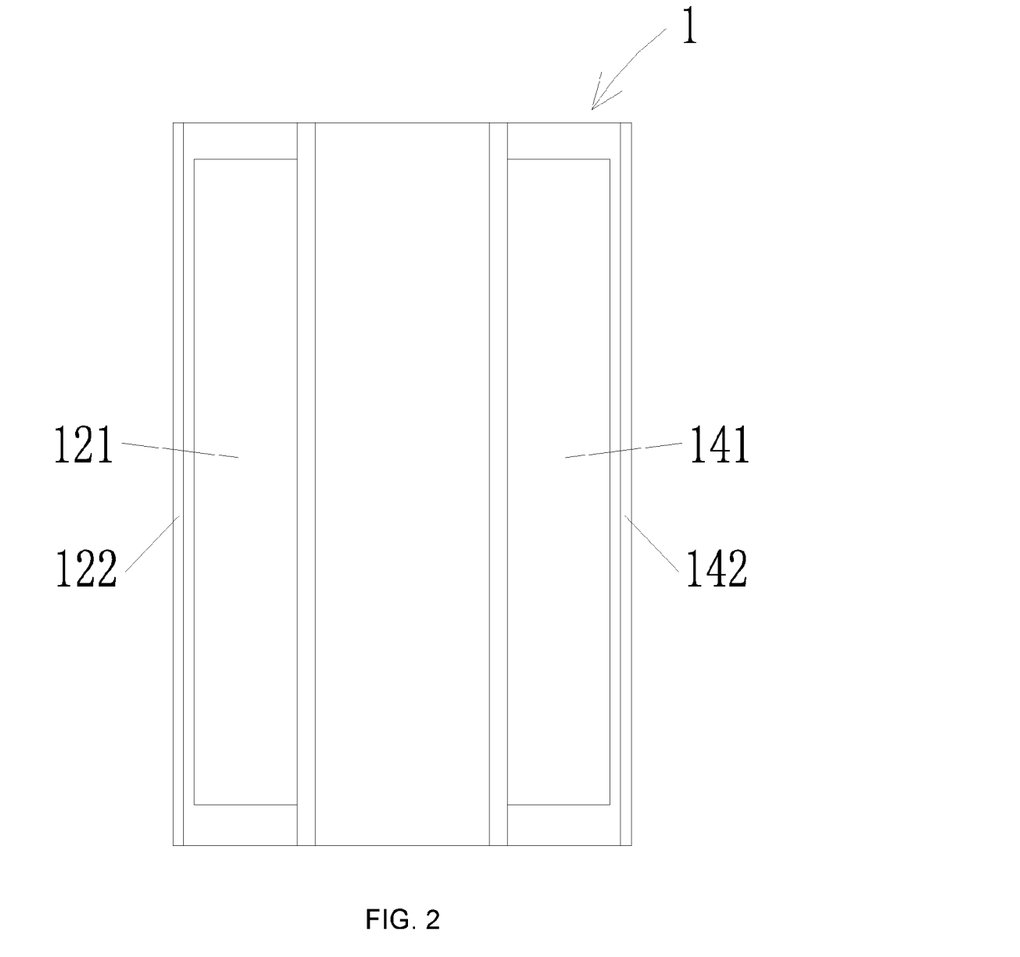
FIG. 2 is a top view structure diagram of a double side display frame provided by the embodiment of the present invention.
Figure 3:
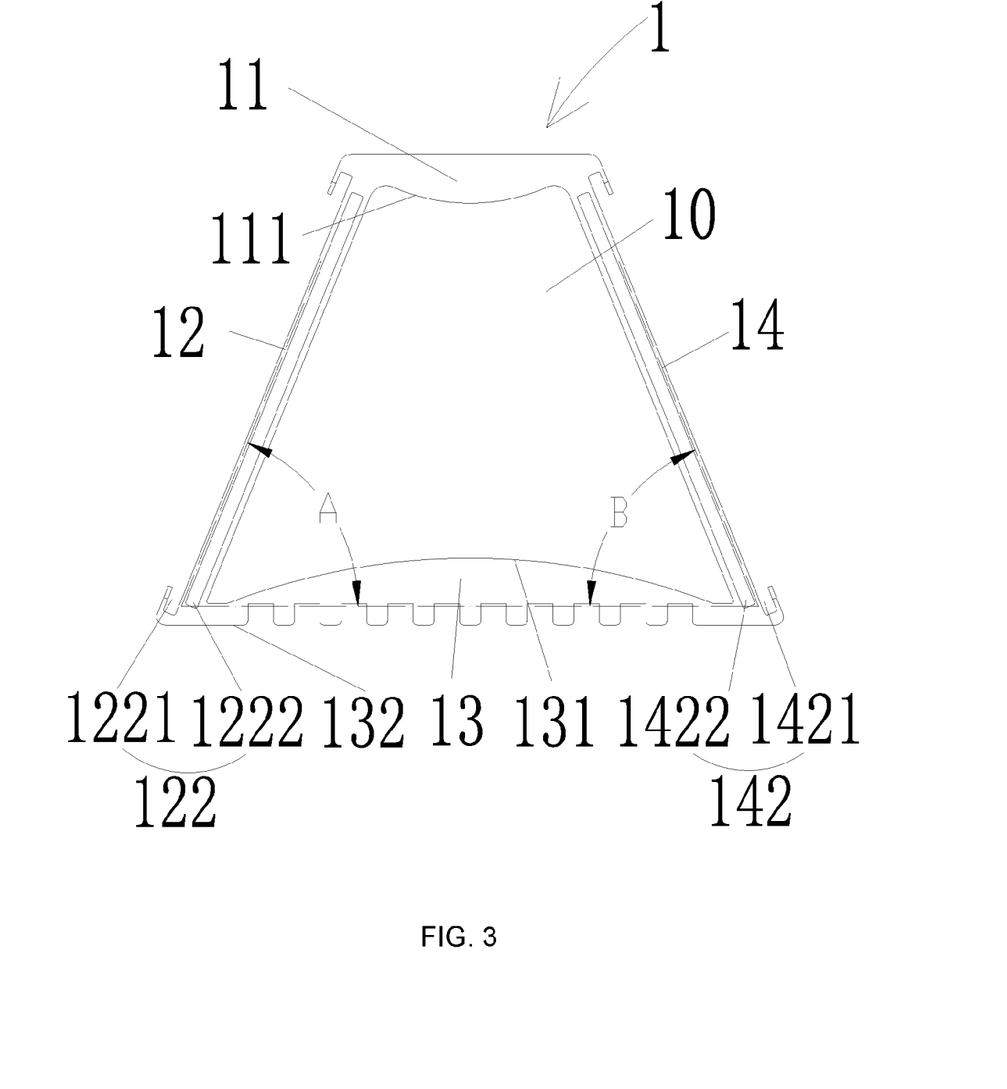
FIG. 3 is a front view structure diagram of a double side display frame provided by the embodiment of the present invention.

Please refer to FIG. 1 to FIG. 3. The embodiment of the present invention provides a double side display frame 1, comprising a top 11, a first side part 12, a bottom 13 and a second side part 14 which are connected end to end and jointly surround a backlight cavity 10, and the bottom 13 and the top 11 are oppositely located between the first side part 12 and the second side part 14. The first side part 12 comprises a first window 121 and a first installation slot 122, and the first window 121 penetrates a middle part of the first side part 12 and communicates with the backlight cavity 10, and the first installation slot 122 is located at periphery of the first window 121. The second side part 14 comprises a second window 141 and a second installation slot 142, and the second window 141 penetrates a middle part of the second side part 14 and communicates with the backlight cavity 10, and the second installation slot 142 is located at periphery of the second window 141. The bottom 13 comprises a first surface 131 facing the top 11, and the first surface 131 protrudes toward the top 11.

In this embodiment, as the double side display frame 1 of the present invention is employed to install the display panels to form the double side display, two display panels are respectively installed in the first installation slot 122 and the second installation slot 142, and respectively cover the first window 121 and the second window 141 for achieving the double display function of the double side display. Meanwhile, the light source is located on the first surface 131. Because the first surface 131 protrudes toward the top 11, the light source has a very large lighting angle, and the light emitted by the light source can uniformly enter the backlight cavity 10. Namely, the issue of the backlight cavity 10 that partial space light is sufficient and partial space light is insufficient can be prevented. After the light emitted by the light source is uniformly mixed in the backlight cavity 10, the light enters the two display panels, and thus to provide the backlight source for the two display panels. Accordingly, the brightness of the two display panels which are installed in the double side display frame 1 is uniform.

It should be understood that in this embodiment, material of the double side display frame 1 can use metal material, which preferably is the AL6063 (aluminium alloy), and the material stability is good and can reflect the light. The double side display frame 1 generally further comprises two end parts which are connected to the top 11, the first side part 12, the bottom 13 and the second side part 14 at the same time. Meanwhile, the light source is located on the first surface 131. Because the first surface 131 protrudes toward the top 11, the light source has a very large lighting angle, and the light emitted by the light source can uniformly enter the backlight cavity 10. Namely, the issue of the backlight cavity 10 that partial space light is sufficient and partial space light is insufficient can be prevented. The two end parts also can be hollow or opened for satisfying other application requirements.

In this embodiment, the rough shape of the double side display frame 1 can be a trapezoid but not restricted thereto. Then, the top 11 is equivalent to the upper base of the trapezoid, and the bottom 13 is equivalent to the lower base of the trapezoid, and the first side part 12 and the second side part 14 are equivalent to the two sides of the trapezoid. Meanwhile, is should be noted that "the bottom 13 and the top 11 are oppositely located" does not limit that the bottom 13 and the top 11 have to be parallel with each other. The bottom 13 and the top 11 can be roughly parallel. Otherwise, the bottom 13 and the top 11 can form a certain angle.

Specifically, in the description of the present invention, the pointed directions or position relationships of the terms, "top", "bottom", "first side part" and "second side part" are based on what are shown in figures. It is merely for convenience for describing the present invention but not the requirements for the structure and operation of the present invention in the specific directions. As an illustration, in the specific using procedure, the double side display frame 1 can have various arrangement according different requirements. The positions of the top 11 and the bottom 13 can be exchanged with each other. For instance, the bottom 13 can be above the top 11.

Furthermore, referring to FIG. 3, the first side part 12 and the bottom 13 form a first angle A, and the second side part 14 and the bottom 13 form a second angle B, and both the first angle A and the second angle B are acute angles. Namely, both the first side part 12 and the second side part 14 are tilted toward the direction of approaching to each other. Preferably, the first angle A is between 30° and 60°, and the second angle B is between 30° and 60°. Then, the light in the backlight cavity 10 has the best light mixing environment.

Certainly, with a certain condition, such as for satisfying the watch view angle at some particular occasion, the first angle A and the second angle B also can be straight angles or obtuse angles. Namely, the first side part 12 and the second side part 14 are parallel with each other or are tilted toward the direction of being away from each other.

Furthermore, referring to FIG. 3, a middle part of the first surface 131 protrudes toward the top 11 relative to two sides of the first surface 131, and thus to make the light source located thereon have the larger lighting angle. The two sides in this embodiment means the two side parts of the first surface 131 which are respectively close to the first side part 12 and the second side part 14. Certainly, as the first side part 12 and the second side part 14 form the angles which are roughly the same with the bottom 13, it is the best for the two sides that the first surface 131 is relatively located in the middle.

Furthermore, referring to FIG. 3, the first surface 131 is a cambered face. Certainly, the first surface 131 can have other shapes, such as a step surface.

Furthermore, referring to FIG. 3, the bottom 13 further comprises a second surface 132 oppositely located to the first surface 131, and the second surface 132 comprises cooling fins or thermotubes so that the double side display frame can cool in time to ensure the proper working temperature. Certainly, the second surface 132 also can comprise the cooling structure or the cooling elements of other forms as long as the cooling of the double side display frame 1 can be realized.

Please refer to FIG. 3. As being one preferred embodiment of the present invention, the top 11 of the double side display frame 1 comprises a first face 111 facing the bottom 13, and the first face 111 protrudes toward the bottom 13. In this embodiment, the first face 111 is employed to reflect the light so that the light mixture in the backlight cavity can be more uniform. As the first face 111 protrudes toward the bottom 13, the first face 111 can have a larger reflective area, and the reflection is more uniform.

Furthermore, a middle part of the first face 111 protrudes toward the bottom 13 relative to two sides of the first face 111 for promoting the light mixture uniformity in the backlight cavity 10. The two sides in this embodiment means the two side parts of the first face 111 which are respectively close to the first side part 12 and the second side part 14. Certainly, as the first side part 12 and the second side part 14 form the angles which are roughly the same with the top 11, it is the best for the two sides that the first face 111 is relatively located in the middle.

Furthermore, referring to FIG. 3, the first face 111 is a cambered face, which makes the process of the double side display frame 1 easier. Certainly, the first face 111 can be a step face or a serrated face. Preferably, the first face 111 is an irregular serrated face to make the reflection of the light irradiated on the first face 111 irregular for promoting the uniformity of light mixture.

Furthermore, both the first surface 131 and the first face 111 utilize high diffuse reflection material or are coated with high diffuse reflection coating layer to make the reflected light irregular for promoting the uniformity of light mixture.

Figure 4:
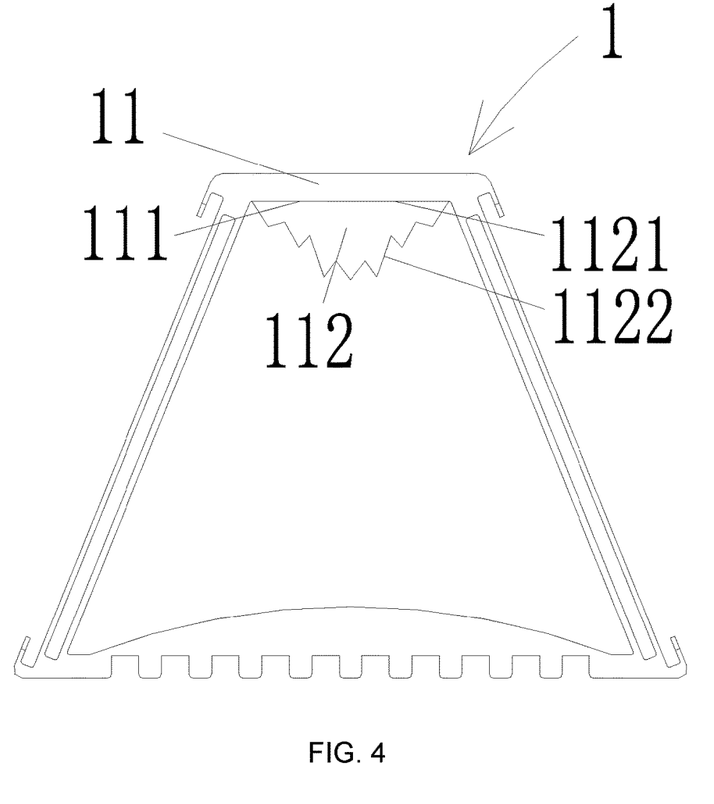
FIG. 4 is a front view structure diagram of another double side display frame provided by the embodiment of the present invention.

Please refer to FIG. 4, as being another preferred embodiment of the present invention, the double side display frame 1 further comprises a reflective component 112, and the reflective component 112 comprises a installation face 1121 and a reflective face 1122 which are oppositely located, and the installation face 1121 is located to be adhered to the first face 111, and the reflective face 1122 protrudes toward a direction away from the installation face 1121. In this embodiment, the reflective face 1122 reflects the light irradiating thereon, and an area of the reflective face 1122 is larger than an area of the first face 111 to increase the reflection area for promoting the light mixture uniformity. Furthermore, both the reflective face 1122 utilizes high diffuse reflection material or are coated with high diffuse reflection coating layer to make the reflected light irregular for promoting the uniformity of light mixture.

Furthermore, referring to FIG. 1 to FIG. 3, the first installation slot 122 comprises two first sub installation slots (1221, 1222), which are employed to install the various parts of the display panel, such as to respectively locate the cell and the optical module. Similarly, the second installation slot 124 also comprises two second sub installation slots (1421, 1422), which are employed to install the various parts of the display panel.

Figure 5:
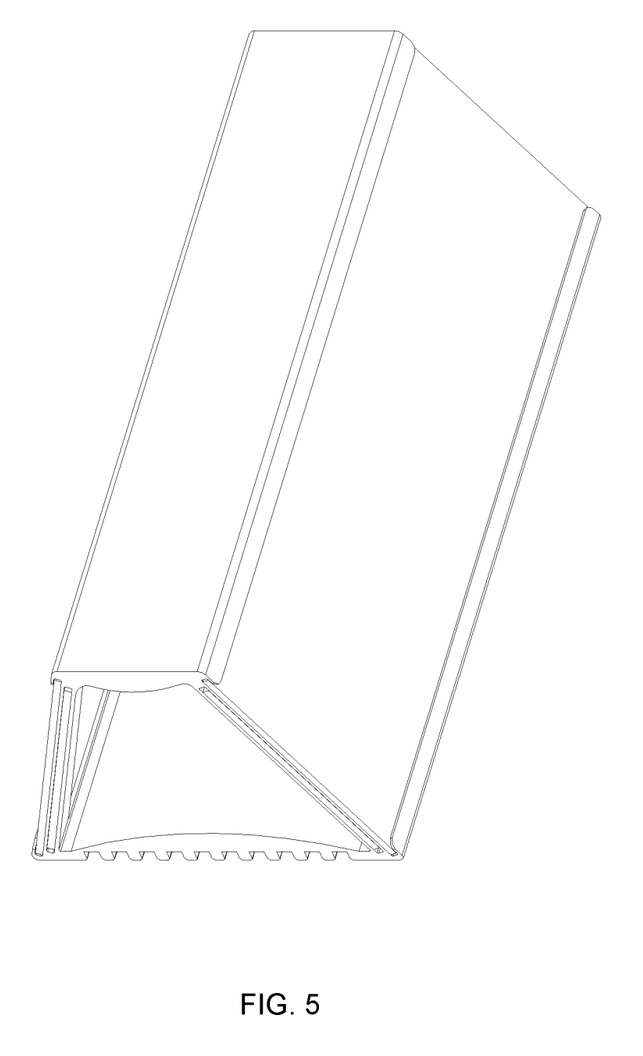
FIG. 5 is a stereoscopic structure diagram of a double side display provided by the embodiment of the present invention.
Figure 6:
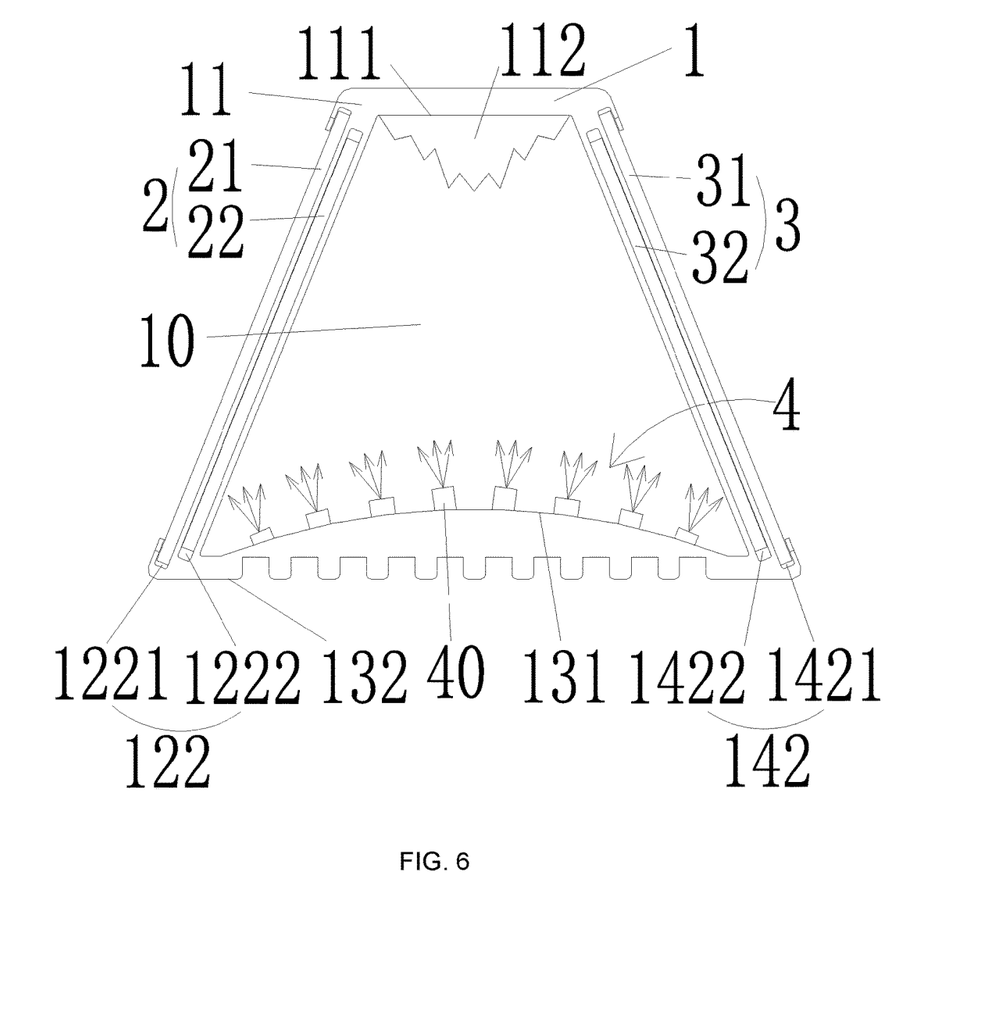
FIG. 6 is a front view structure diagram of a double side display provided by the embodiment of the present invention.

Please refer to FIG. 5 and FIG. 6. The embodiment of the present invention further provides a double side display, comprising a first display panel 2, a second display panel 3, a light source component 4 and the double side display frame 1 as described in the aforesaid embodiments (Please refer from FIG. 1 to FIG. 4, together). The first display panel 2 is installed in the first installation slot 122 and covers the first window 121 to provide a first display surface for the double side display. The second display panel 3 is installed in the second installation slot 142 and covers the second window 141 to provide a second display surface for the double side display. The light source component 4 is installed on the first surface 131. The light emitted by the light source component 4 passes through the backlight cavity 10 and then enters the first display panel 2 and the second display panel 3.

In this embodiment, the light source component 4 is distributed on the first surface 131 of the double side display frame 1. Because the first surface 131 protrudes toward the top 11, the light source component 4 has a very large lighting angle, and the light emitted by the light source component 4 can uniformly enter the backlight cavity 10. Namely, the issue of the backlight cavity 10 that partial space light is sufficient and partial space light is insufficient can be prevented. After the light emitted by the light source component 4 is uniformly mixed in the backlight cavity 10, the light enters the first display panel 2 and the second display panel 3 respectively, and thus to provide the backlight source for the first display panel 2 and the second display panel 3. Accordingly, the brightnesses of first display panel 2 and the second display panel 3 are uniform. Moreover, the first display panel 2 and the second display panel 3 have the same display brightness, and the display brightness of the double side display is uniform.

It should be understood that in this embodiment, a middle part of the first surface 131 of the double side display frame 1 protrudes toward the top 11 relative to two sides of the first surface 131. The light source component 4 comprises a plurality of light sources 40, and the plurality of light sources 40 are uniformly and separately distributed on the first surface 131 so that the light intensities of the light source component 4 which are allocated to the first display panel 2 and the second display panel are consistent. Certainly, the light source component 4 also can have other assembled formations, such as light source s of strip shape or plane shape. Preferably, the light source is an LED (Light Emitting Diode). The second surface 132 comprises cooling fins or thermotubes so that the heat generated by the light source component 4 can be dissipated rapidly through the second surface 132 to ensure the proper working temperature of the double side display. The first face 111 of the top 11 protrudes toward the bottom 13 or the first face 111 of the top 11 is set with a reflective component 112. Either can reflect the light emitted by the light source component 4 more smoothly and more efficiently to make the light mixed in the backlight cavity 10. The light in the backlight cavity 10 is projected or reflected toward surfaces of the first display panel 2 and the second display panel 3 facing the backlight cavity 10. As the light is reflected, it is beneficial for mixing the light in the backlight cavity 10 more uniformly.

Furthermore, referring to FIG. 5 to FIG. 6, the first installation slot 122 comprises two first sub installation slots (1221, 1222), which are employed to install the various parts of the first display panel 2, such as to respectively locate the first cell 21 and the first optical module 22. The first cell 21 and the first optical module 22 are separately stacked up. The first optical module 22 is located close to the position of the backlight cavity 10 for processing the light entering the first cell 21 in advance. Similarly, the second installation slot 142 also comprises two first sub installation slots (1421, 1422), which are employed to install the various parts of the second display panel, such as to respectively locate the second cell 31 and the second optical module 32. The second cell 31 and the second optical module 32 are separately stacked up. The second optical module 32 is located close to the position of the backlight cavity 10 for processing the light entering the second cell 31 in advance.

The detail description has been introduced above for the embodiment of the invention. Herein, a specific case is applied in this article for explain the principles and specific embodiments of the present invention have been set forth. The description of the aforesaid embodiments is only used to help understand the method of the present invention and the core idea thereof; meanwhile, for those of ordinary skill in the art, according to the idea of the present invention, there should be changes either in the specific embodiments and applications but in sum, the contents of the specification should not be limitation to the present invention.

What is claimed is:

1. A double side display frame, comprising a top, a first side part, a bottom and a second side part which are connected end to end and jointly surround a backlight cavity, and the bottom and the top are oppositely located between the first side part and the second side part;
   the first side part comprises a first window and a first installation slot, and the first window penetrates a middle part of the first side part and communicates with the backlight cavity, and the first installation slot is located at periphery of the first window;
   the second side part comprises a second window and a second installation slot, and the second window penetrates a middle part of the second side part and communicates with the backlight cavity, and the second installation slot is located at periphery of the second window;
   the bottom comprises a first surface facing the top, and the first surface protrudes toward the top;
   wherein the double side display frame further comprises a reflective component, and the reflective component comprises a installation face and a reflective face which are oppositely located, and the top comprises a first face facing the bottom, and the installation face is located to be adhered to the first face, and the reflective face protrudes toward a direction away from the installation face.

2. The double side display frame according to claim 1, wherein the first side part and the bottom form a first angle, and the second side part and the bottom form a second angle, and both the first angle and the second angle are acute angles.

3. The double side display frame according to claim 1, wherein a middle part of the first surface protrudes toward the top relative to two sides of the first surface.

4. The double side display frame according to claim 2, wherein the first surface is a cambered surface or a step surface.

5. The double side display frame according to claim 1, wherein the bottom further comprises a second surface oppositely located to the first surface, and the second surface comprises cooling fins or thermotubes.

6. The double side display frame according to claim 1, wherein the top comprises a first face facing the bottom, and the first face protrudes toward the bottom.

7. The double side display frame according to claim 6, wherein a middle part of the first face protrudes toward the bottom relative to two sides of the first face.

8. The double side display frame according to claim 6, wherein the first face is a cambered face, a step face or a serrated face.

9. A double side display, comprising a first display panel, a second display panel, a light source component and a double side display frame;
   the double side display frame comprises a top, a first side part, a bottom and a second side part which are connected end to end and jointly surround a backlight cavity, and the bottom and the top are oppositely located between the first side part and the second side part;
   the first side part comprises a first window and a first installation slot, and the first window penetrates a middle part of the first side part and communicates with the backlight cavity, and the first installation slot is located at periphery of the first window;
   the second side part comprises a second window and a second installation slot, and the second window penetrates a middle part of the second side part and communicates with the backlight cavity, and the second installation slot is located at periphery of the second window;
   the bottom comprises a first surface facing the top, and the first surface protrudes toward the top;
   the first display panel is installed in the first installation slot and covers the first window;
   the second display panel is installed in the second installation slot and covers the second window;
   the light source component is installed on the first surface, and light emitted by the light source component passes through the backlight cavity and then enters the first display panel and the second display panel;
   wherein the double side display frame further comprises a reflective component, and the reflective component comprises a installation face and a reflective face which are oppositely located, and the top comprises a first face facing the bottom, and the installation face is located to be adhered to the first face, and the reflective face protrudes toward a direction away from the installation face.

10. The double side display frame according to claim 9, wherein the first side part and the bottom form a first angle, and the second side part and the bottom form a second angle, and both the first angle and the second angle are acute angles.

11. The double side display according to claim 9, wherein a middle part of the first surface protrudes toward the top relative to two sides of the first surface.

12. The double side display according to claim 10, wherein the first surface is a cambered surface or a step surface.

13. The double side display according to claim 9, wherein the bottom further comprises a second surface oppositely located to the first surface, and the second surface comprises cooling fins or thermotubes.

14. The double side display according to claim 9, wherein the top comprises a first face facing the bottom, and the first face protrudes toward the bottom.

15. The double side display according to claim 14, wherein a middle part of the first face protrudes toward the bottom relative to two sides of the first face.

16. The double side display according to claim 14, wherein the first face is a cambered face, a step face or a serrated face.

* * * * *